(12) United States Patent
Nishikawa

(10) Patent No.: US 8,832,484 B2
(45) Date of Patent: Sep. 9, 2014

(54) IMAGE FORMING APPARATUS AND IMAGE READING APPARATUS

(75) Inventor: Naoki Nishikawa, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 363 days.

(21) Appl. No.: 13/415,817

(22) Filed: Mar. 8, 2012

(65) Prior Publication Data
US 2012/0278643 A1 Nov. 1, 2012

(30) Foreign Application Priority Data
Apr. 28, 2011 (JP) ................................. 2011-100869

(51) Int. Cl.
*G06F 1/32* (2006.01)
(52) U.S. Cl.
USPC ........................... 713/324; 713/300; 713/320
(58) Field of Classification Search
None
See application file for complete search history.

(56) References Cited

U.S. PATENT DOCUMENTS

| 2008/0201594 | A1  | 8/2008  | Narushima |
|---|---|---|---|
| 2008/0229121 | A1* | 9/2008  | Lassa et al. ................... 713/300 |
| 2009/0055673 | A1* | 2/2009  | Kitajima ....................... 713/340 |
| 2012/0274972 | A1  | 11/2012 | Nishikawa |
| 2012/0274973 | A1  | 11/2012 | Nishikawa |

FOREIGN PATENT DOCUMENTS

JP 2008-204209 A 9/2008

* cited by examiner

*Primary Examiner* — Paul Yanchus, III
(74) *Attorney, Agent, or Firm* — Merchant & Gould PC

(57) ABSTRACT

An image forming apparatus includes: an image forming unit; a power supply controller controls the image forming apparatus to operate in a power saving mode in which supply of power to the image forming unit is cut off and a normal mode; and a plurality of interfaces configured to receive a transition command for transition from the power saving mode to the normal mode. The power supply controller performs: an interface-power supply process of supplying power to at least one of the plurality of interfaces; and a changing process of, in a case where a predetermined signal is input to an operating interface receiving power in the interface-power supply unit in the power saving mode, cutting off power supply to the operating interface and starting power supply to at least one of idle interfaces other than the operating interface.

9 Claims, 6 Drawing Sheets

FIG. 3

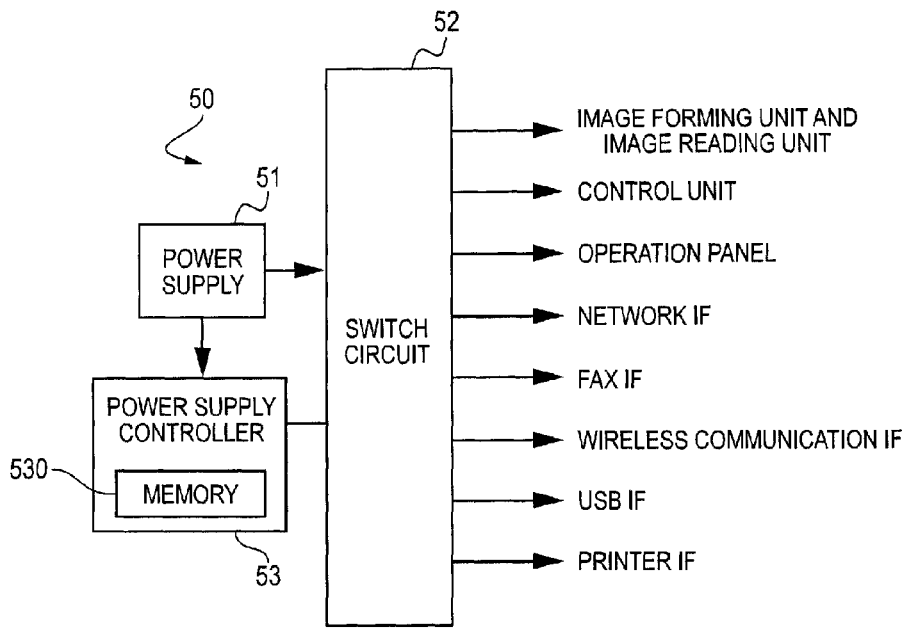

FIG. 4

| OPERATING IF | PREDETERMINED PROCESS | CHANGE DESTINATION | TIMEOUT PERIOD |
|---|---|---|---|
| OPERATION PANEL | PUSHING DEDICATED BUTTON FOR FAX RECEPTION | FAX IF | 30 MINUTES |
| OPERATION PANEL | PUSHING DEDICATED BUTTON FOR NETWORK RECEPTION | NETWORK IF | 10 MINUTES |
| OPERATION PANEL | PUSHING DEDICATED BUTTON FOR USB RECEPTION | USB IF | 10 MINUTES |
| NETWORK IF | RECEIVING SPECIFIC PACKET | USER'S SELECTION | 30 MINUTES |
| FAX IF | — | — | — |
| WIRELESS COMMUNICATION IF | RECEIVING SPECIFIC PACKET | NETWORK IF | 10 MINUTES |
| USB IF | NORMALLY FINISHING USER'S AUTHENTIFICATION | NETWORK IF | 10 MINUTES |
| PRINTER IF | RECEIVING SPECIFIC PACKET | OPERATION PANEL | 10 MINUTES |

IMAGE FORMING APPARATUS AND IMAGE READING APPARATUS

CROSS-REFERENCE TO RELATED APPLICATIONS

This application claims priority from Japanese Patent Application No. 2011-100869 filed on Apr. 28, 2011, the entire subject matter of which is incorporated herein by reference.

TECHNICAL FIELD

The present invention relates to an image forming apparatus and an image reading apparatus having a power saving mode for suppressing power consumption, and more specifically, to an image forming apparatus and an image reading apparatus having a plurality of interfaces for receiving a transition command for transitioning from a power saving mode to a normal mode.

BACKGROUND

There have been proposed an electronic apparatus such as a printer or a scanner handling an image which, when the electronic apparatus is not used, transitions from a normal mode to a power saving mode, in which some functions are deactivated to suppress power consumption, so as to save electric power. When the electronic apparatus operates in the power saving mode, power is not supplied to any interface other than an interface for receiving a transition command for transitioning from the power saving mode to the normal mode.

For example, there have been proposed a printer, which has a plurality of interfaces for receiving the transition command, and which is configured to select some interfaces to be used among the plurality of interfaces according to automatic selection, user's designation, a frequency of use, or the like, and not to supply power to interfaces except for the selected interfaces.

SUMMARY

Illustrative aspects of the present invention provide an image forming apparatus and an image reading apparatus capable of saving electric power while effectively using interfaces.

BRIEF DESCRIPTION OF THE DRAWINGS

FIG. 3 is a block diagram illustrating a configuration of a power-supply control system;

FIG. 4 is a view illustrating an example of a database storing predetermined processes and change destinations in association with interfaces;

DETAILED DESCRIPTION

General Overview

Figure 1:
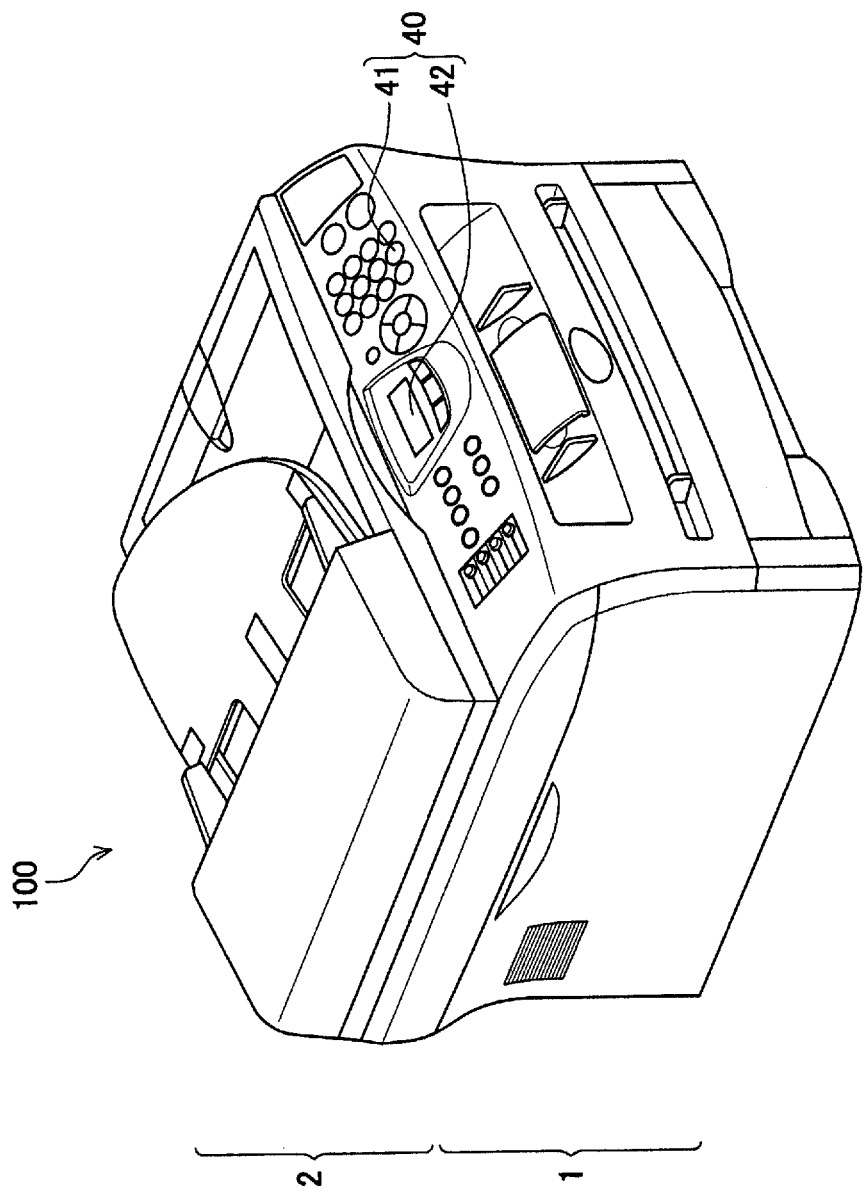
FIG. 1 is a perspective view illustrating the appearance of a multi-function peripheral (MFP) according to an exemplary embodiment.

In the above-described related-art printer, in the power saving mode, in a case where it is desired to use an interface other than the selected interface, the power saving mode should be released through the selected interface for using the desired interface. Furthermore, if the power saving mode is released, since power is supplied to the entire system, it is wasteful and goes against saving electric power.

Therefore, illustrative aspects of the present invention provide an image forming apparatus and an image reading apparatus capable of saving electric power while effectively using interfaces.

According to a first illustrative aspect of the present invention, there is provided an image forming apparatus comprising: an image forming unit configured to form an image; a power supply controller configured to control the image forming apparatus to operate in a power saving mode, in which supply of power to the image forming unit is cut off, and a normal mode, in which supply of power to the image forming unit is performed, wherein the power supply controller is configured to be switched between the power saving mode and the normal mode; and a plurality of interfaces configured to receive a transition command for transition from the power saving mode to the normal mode, wherein the power supply controller is configured to perform: an interface-power supply process of supplying power to at least one of the plurality of interfaces; and a changing process of, in a case where a predetermined signal is input to an operating interface receiving power in the interface-power supply unit in the power saving mode, cutting off power supply to the operating interface and starting power supply to at least one of idle interfaces other than the operating interface.

The image forming apparatus of the present invention has the power saving mode and the normal mode as modes for controlling supply of power to the image forming unit. Further, the image forming apparatus has the plurality of interfaces capable of receiving a transition command for transition from the power saving mode to the normal mode. In the image forming apparatus of the present invention, if a predetermined signal is input to an operating interface, power supply to the operating interface is cut off, and power supply to at least one of the idle interfaces starts. Any one of the cutoff of the power supply to the operating interface and the start of power supply to the idle interface may be first performed, or both of them may be performed in parallel.

That is, in the image forming apparatus of the present invention, if the predetermined signal is input to the operating interface in the power saving mode, a predetermined interface changes into an operating interface, without transition to the normal mode. Therefore, in a case where a signal input to the operating interface is the predetermined signal, wasted power is not consumed for changing the operating interface.

According to a second illustrative aspect of the present invention, in the image forming apparatus, wherein the predetermined signal has a plurality of kinds, and wherein the power supply controller in the changing process determines an idle interface to be a power supply target on the basis of the kind of the predetermined signal.

Since an interface to be a change destination is determined according to the kind of the predetermined signal, it is possible to apply the present invention to more situations.

According to a third illustrative aspect of the present invention, in the image forming apparatus, wherein the power supply controller in the changing process determines an idle interface to be a power supply target on the basis of a kind of the operating interface having received the predetermined signal.

Since an interface to be a change destination is determined according to the kind of the interface, it is possible to apply the present invention to more situations.

According to a fourth illustrative aspect of the present invention, in the image forming apparatus, wherein the power supply controller is further configured to perform a selecting process of allowing a user to select an idle interface to be a power supply target when the predetermined signal is input to the operating interface, and wherein the power supply controller in the changing process starts power supply to the idle interface selected in the selecting process.

If the user is offered a choice when the change destination is determined, it is possible to improve usability.

According to a fifth illustrative aspect of the present invention, in the image forming apparatus, wherein the power supply controller is further configured to perform a second changing process of, in a case where an idle time period of the operating interface to which power supply has started in the changing process is equal to or longer than a threshold time period, cutting off power supply to the operating interface and restarting power supply to the idle interface for which the power supply has been cut off in the changing process.

After an operating interface was changed, if the operating interface has not been used for a long time, there is a high possibility that it has been forgotten that it has become unnecessary to use the operating interface or the operating interface has been changed. On the other hand, it is difficult for a third party to grasp that the operating interface has been changed. For this reason, in this case, it is preferable to return the operating interface to its original state.

According to a sixth illustrative aspect of the present invention, in the image forming apparatus, wherein the power supply controller is further configured to perform: a checking process of checking whether the operating interface, to which power supply has started in the changing process, is enabled; and a third changing process of, in a case where the operating interface checked in the checking process is disabled, cutting off power supply to the disabled operating interface and restarting power supply to the idle interface for which the power supply has been cut off in the changing process.

In a case where the operating interface which is the change destination is disabled, if the operating interface is changed, there is a likelihood that it will be impossible to receive any transition command. For this reason, in this case, it is preferable to return the operating interface to its original state.

According to a seventh illustrative aspect of the present invention, in the image forming apparatus, wherein the power supply controller is further configured to perform a warning process of, in a case where the operating interface checked in the checking process is disabled, warning a user about that the operating interface, to which power supply has started in the changing process, is disabled.

It is not desirable that the disabled state continues. For this reason, it is preferable to warn the user about the disabled state such that the user recognizes that the operating interface is disabled.

According to an eighth illustrative aspect of the present invention, there is provided an image reading apparatus comprising: an image reading unit configured to read an image; a power supply controller configured to control the image reading apparatus to operate in a power saving mode, in which supply of power to the image reading unit is cut off, and a normal mode, in which supply of power to the image reading unit is performed, wherein the power supply controller is configured to be switched between the power saving mode and the normal mode; and a plurality of interfaces configured to receive a transition command for transition from the power saving mode to the normal mode, wherein the power supply controller is configured to perform: an interface-power supply process of supplying power to at least one of the plurality of interfaces; and a changing process of, in a case where a predetermined signal is input to an operating interface receiving power in the interface-power supply process in the power saving mode, cutting off power supply to the operating interface and starting power supply to at least one of idle interfaces other than the operating interface.

According to a ninth illustrative aspect of the present invention, there is provided a multi-function peripheral comprising: an image forming unit configured to form an image; an image reading unit configured to read an image; a power supply controller configured to control the multi-function peripheral to operate in a power saving mode, in which supply of power to the image forming unit and the image reading unit is cut off, and a normal mode, in which supply of power to the image forming unit and the image reading unit is performed; and a plurality of interfaces configured to receive a transition command for transition from the power saving mode to the normal mode, wherein the power supply controller is configured to perform: an interface-power supply process of supplying power to at least one of the plurality of interfaces; and a change process of, in a case where a predetermined signal is input to an operating interface receiving power in the power saving mode, cutting off power supply to the operating interface and starting power supply to at least one of idle interfaces other than the operating interface.

According to the illustrative aspects of the present invention, it is possible to implement an image forming apparatus and an image reading apparatus which are capable of saving electric power while effectively using interfaces.

Exemplary Embodiments

Hereinafter, exemplary embodiments of the present invention will be described in detail with reference to the accompanying drawings. The exemplary embodiments may be implemented by applying the present invention to a multi-function peripheral (MFP) having a power saving mode for suppressing power consumption.

[Configuration of MFP]

As shown in FIG. 1, an MFP 100 according to the exemplary embodiment includes an image forming unit 1 for printing an image on a paper sheet, and an image reading unit 2 for reading an image of a document. The image forming type of the image forming unit 1 may be an electrographic type or an ink-jet type. Also, the image forming unit 1 may be capable of forming color images, or may be capable of forming only monochrome images.

The MFP 100 includes an operation panel 40 on a front side thereof. The operation panel 40 includes a button group 41 including various buttons (for example, a start key, a stop key, and individual buttons of a numeric keypad), and a display unit 42 that is composed of a liquid crystal display. The button group 41 and the display unit 42 enable display of an operation status, and allow a user to perform input operation.

The MFP 100 includes various interfaces for receiving signals from the outside. Upon receiving a transition command through an interface in the power saving mode, the MFP 100 switches a mode regarding power supply from the power supply destination to a ready mode (one example of a normal mode). Even if the operation panel 40 is operated, the power saving mode can be released. That is, the operation panel 40 has one interface capable of receiving a transition command for transition from the power saving mode to the ready mode. Various interfaces and various modes will be described below.

[Electrical Configuration of MFP]

Figure 2:
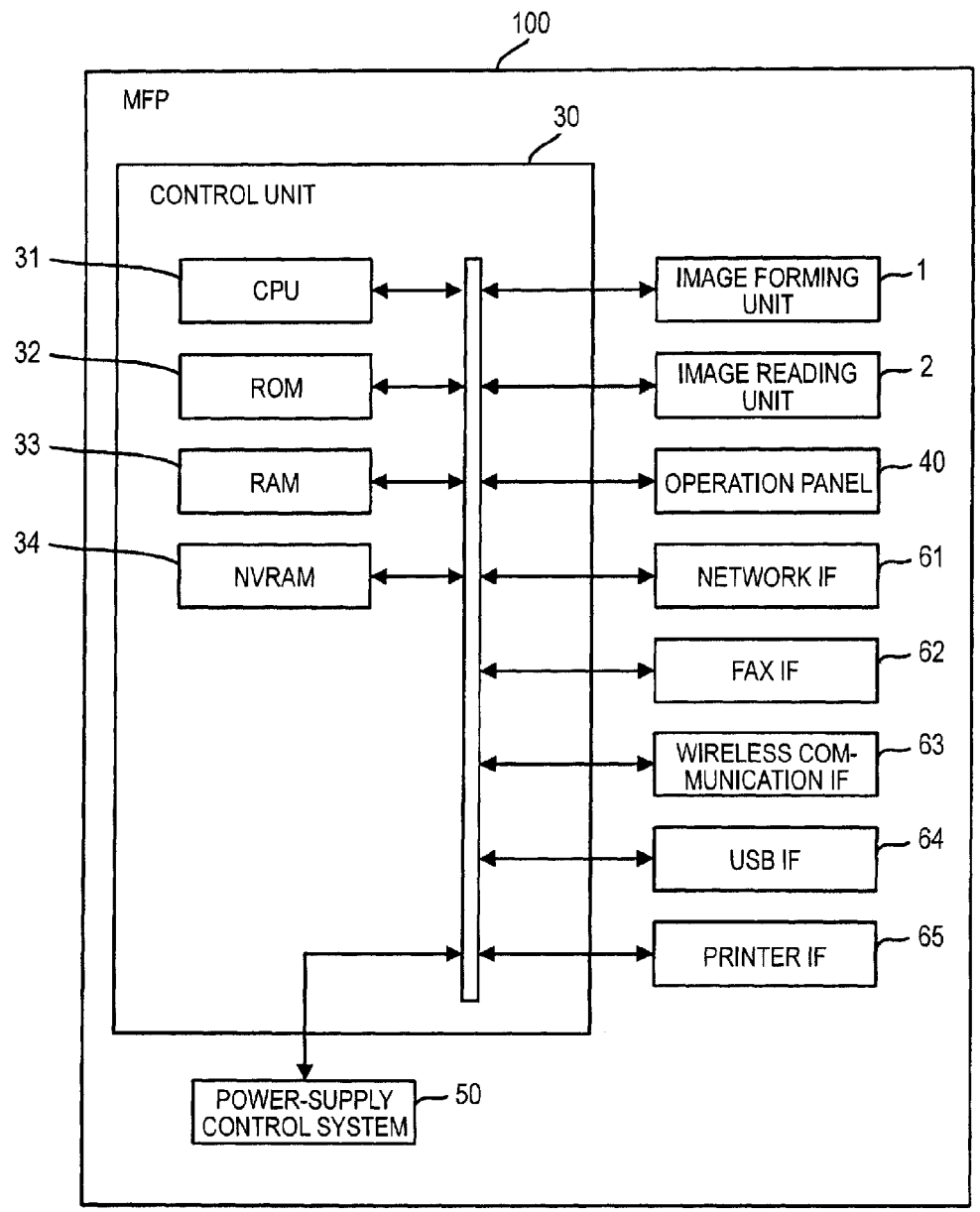
FIG. 2 is a block diagram illustrating an electrical configuration of the MFP shown in FIG. 1.

Subsequently, an electrical configuration of the MFP 100 will be described. As shown in FIG. 2, the MFP 100 includes a control unit 30 including a CPU 31, a ROM 32, a RAM 33, and a non-volatile RAM (NVRAM) 34.

The control unit 30 is electrically connected to the image forming unit 1, the image reading unit 2, the operation panel 40, a power-supply control system 50 for controlling supply of power to each component, and various interfaces such as a network interface 61, a fax interface 62, a wireless communication interface 63, a USB interface 64, and a printer interface 65. For example, the control unit 30 acquires a signal of image data from the image reading unit 2. Further, the control unit 30 outputs a signal for generating a desired image, to the image forming unit 1. Furthermore, the control unit 30 receives signals of various buttons from the button group 41. Moreover, the control unit 30 outputs a signal of contents to be displayed, to the display unit 42.

The ROM 32 stores various control programs for controlling the MFP 100, image processing programs, various options, initial values, and so on. The RAM 33 is used as a work area into which various control programs are read, or as a storage area for temporarily storing image data of a document read by the image reading unit 2 or image data received through various interfaces. The NVRAM 34 is a non-volatile storage means, and is used as a storage area for storing various options, image data, and so on.

The CPU 31 performs operations for implementing various functions, such as an image reading function and an image forming function, in the MFP 100. The CPU 31 functions as a center for control. The CPU 31 stores process results in the RAM 33 or the NVRAM 34 in accordance with control programs read from the ROM 32 and controls each component of the MFP 100.

The network interface 61 is connected to a network, such that the MFP 100 can perform data communication with other information processing apparatuses through the network interface 61. The fax interface 62 is connected to a public line, such that the MFP 100 can perform data communication with an external facsimile and the like, through the fax interface 62. The wireless communication interface 63 establishes wireless communication with other information processing apparatuses, such that the MFP 100 can perform data communication with those information processing apparatuses. The USB interface 64 is directly connected to a USB memory or another information device (such as a card reader), such that the MFP 100 can perform data communication with that information device or the like through the USB interface 64. The printer interface 65 is connected to a printer cable, such that the MFP 100 can perform data communication with another information processing apparatus through the printer interface 65.

[Power Supply Control]

Subsequently, power supply control of the MFP 100 will be described. As shown in FIG. 3, the MFP 100 includes a power supply 51, a switch circuit 52 for distributing power supplied from the power supply 51, to various components of the MFP 100, and a power supply controller 53 for turning on or off each of various switches of the switch circuit 52, as the power-supply control system 50 (one example of a power supply controller). The power supply controller 53 operates independently from the control unit 30, and has a CPU and a memory on its own.

The power supply 51 is composed of a circuit which is connected to, for example, a commercial power supply or a battery. The power supply 51 converts the supplied power into appropriate power and supplies the converted power to each of the components of the MFP 100. The switch circuit 52 switches whether to supply power to each of the components of the MFP 100, on the basis of a command output from the power supply controller 53. Specifically, the MFP 100 has various power supply systems such as a power supply system for the image forming unit 1 and the image reading unit 2, a power supply system for the control unit 30, a power supply system for the operation panel 40, and a power supply system for various interfaces. The switch circuit 52 supplies or cuts off power to each power supply system.

Now, modes of the power-supply control system 50 will be described. The power-supply control system 50 has a ready mode, in which an image can be read or printed, and a power saving mode, in which any image can not be read or printed.

Specifically, in the ready mode, power is supplied to all of the image forming unit 1, the image reading unit 2, the control unit 30, the operation panel 40, and the interfaces 61 to 65, such that a printing operation or a scanning operation becomes possible. On the other hand, in the power saving mode, supply of power to the image forming unit 1 and the image reading unit 2 is cut off, so that printing and reading becomes impossible.

Immediately after the power-supply control system 50 is activated, the power-supply control system 50 operates in the ready mode. Then, in a case where the printing, reading, and user's operation are not performed and duration in which the MFP 100 is not used (hereinafter, referred to as an 'idle time period') is a predetermined time period or more, or in a case where a forced transition command for forcedly performing transition to the power saving mode is input, the power-supply control system 50 transitions from the ready mode to the power saving mode.

The power-supply control system 50 stores settings of interfaces (including the operation panel) to be power-supply continuation targets even if transition to the power saving mode is performed in the memory 530 of the power supply controller 53. Those settings of the interfaces are designated by user's operation in the ready mode. At this time, one or more interfaces may be designated. At least one interface is designated in order to avoid a state in which it is impossible to receive any transition command.

In the power saving mode, the power-supply control system 50 receives a transition command for transition to the ready mode. When transition to the power saving mode is performed, the power-supply control system 50 continues the power supply to the designated interfaces and cuts off the power supply to the other interfaces. Therefore, only the designated interfaces can receive a transition command. Upon receiving a transition command through an interface which continuously receives power supply, the power-supply control system 50 returns to the ready mode from the power saving mode. The reception of the transition command may correspond to operation of the user on the operation panel 40, reception of a signal corresponding to the transition command from another information processing apparatus, or installation of an information device. The reception of the transition command may also correspond to reception of a job from another information processing apparatus.

In the description of the exemplary embodiment, interfaces (i.e., the operation panel 40 and the interfaces 61 to 65 in the exemplary embodiment) capable of receiving a transition command are referred to as an 'interface for return.' Also, an interface for return to which power is continuously supplied in the power saving mode is referred to as an 'operating interface,' and an interface for return to which power is not supplied in the power saving mode is referred to as an 'idle interface.'

Whenever the mode of the power supply controller 53 is changed, a signal for supplying or cutting off power to each of various power supply systems is input to the switch circuit 52. The power supply controller 53 receives power directly from the power supply 51 and always operates even in the power saving mode. Therefore, it is possible to control the switch circuit 52 even in the power saving mode.

If the operating interface receives a predetermined signal as an input other than the transition command in the power saving mode, the power supply controller 53 starts power supply to a predetermined interface for return and cuts off the power supply to the operating interface having received the corresponding signal, without transition to the ready mode. That is, the operating interface having received the signal changes into an idle interface, and an idle interface corresponding to the predetermined signal changes into an operating interface.

Specifically, the power supply controller 53 determines an interface for return which is a change destination to be newly an operating interface, on the basis of a predetermined process (a predetermined signal) corresponding to the interface for return. Therefore, the power supply controller 53 includes a database 531 storing, for each interface for return, a predetermined process associated with the corresponding interface for return, a timeout period, and an interface for return which is a change destination associated with the predetermined process, as shown in FIG. 4. That is, an interface to change into an operating interface is determined on the basis of the kind of each interface for return.

Incidentally, it is not necessarily required to store one predetermined process for one interface for return. For example, a plurality of predetermined processes may be stored for one interface for return. Then, a change destination may be registered for each predetermined process. For example, in a registered example of the database 531 shown in FIG. 4, three predetermined processes of 'PUSHING DEDICATED BUTTON FOR FAX RECEPTION,' 'PUSHING DEDICATED BUTTON FOR NETWORK RECEPTION,' and 'PUSHING DEDICATED BUTTON FOR USB RECEPTION' have been stored for the operation panel 40, and different change destinations have been set for the predetermined processes. That is, for one interface for return, a change destination is determined according to the contents of the predetermined signal.

A symbol '−' registered as a predetermined process in the database 531 means that any predetermined process has not been set. In the present exemplary embodiment, the symbol '−' registered as a predetermined process means a corresponding operating interface for return will not be a change target. Also, 'USER'S SELECTION' registered as a change destination means that the user will select the change destination.

Further, the power supply controller 53 stores a prohibition flag for prohibiting a process of changing an operating interface in the above-described power saving mode. In a case where the prohibition flag is in an ON state, even if the operating interface receives a predetermined process, the power supply controller does not change the operating interface. The prohibition flag is set by user's operation in the ready mode. Incidentally, the prohibition flag is initially in an OFF state (i.e., initial value of the prohibition flag is OFF).

[Power Saving Process]

Subsequently, the procedure of the power saving process (one example of a changing process, a second changing process, and a third changing process) for implementing an operation of changing a power supply destination in the power saving mode will be described with reference to flow charts of FIGS. 5 and 6. If a condition for transition to the power saving mode is satisfied, the power saving process is performed by the power supply controller 53. A case where the condition for transition to the power saving mode is satisfied may correspond to a case where the idle time period of the MFP 100 is equal to or longer than a predetermined time period.

Figure 5:
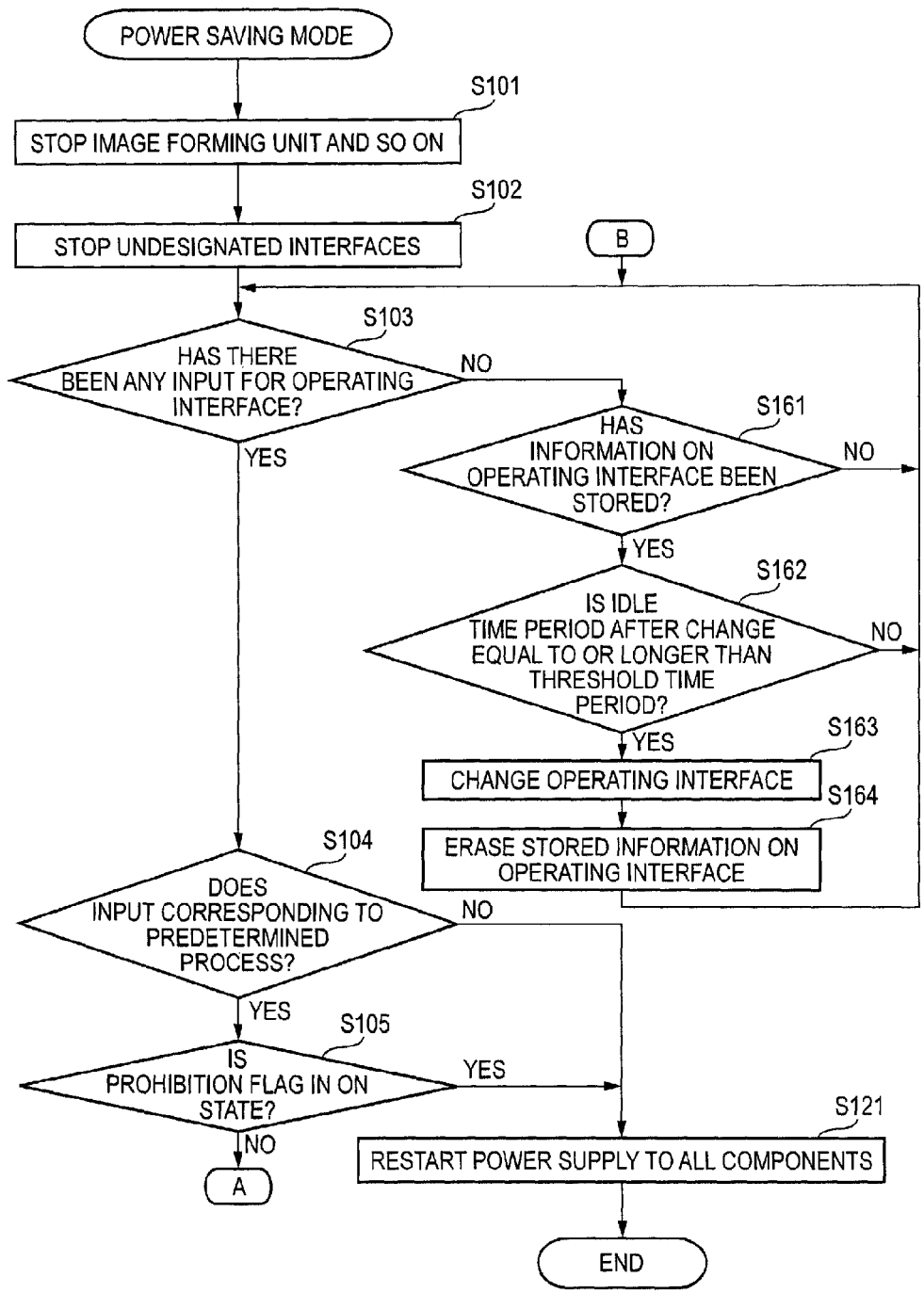
FIG. 5 is a first flow chart illustrating a procedure of a power saving process according to the exemplary embodiment.

In the power saving process, as shown in FIG. 5, in STEP S101, supply of power to the image forming unit 1 and the image reading unit 2 is cut off. Specifically, a switch connected to the power supply system for the image forming unit 1, and a switch connected to the power supply system for the image reading unit 2 are turned off. Incidentally, in STEP S101, the supply of power to the control unit 30 may also be cut off. Since the power supply controller 53 performing the power saving process operates independent from the control unit 30, even if the supply of power to the control unit 30 is cut off, the power supply controller 53 continues to perform the power saving process. Then, in STEP S102, the power supply to the interfaces for return undesignated as interfaces to operate in the power saving mode is cut off. Incidentally, the order of STEP S101 and STEP S102 may be reversed.

Next, in STEP S103, it is determined whether there has been any input for an operating interface. In a case where there has been an input for the operating interface (YES in STEP S103), in STEP S104, it is determined whether the input corresponds to a predetermined process for the operating interface having received the input, with reference to the database 531. If the input corresponds to the predetermined process (YES in STEP S104), in STEP S105, it is determined whether the prohibition flag is in the ON state.

Figure 6:
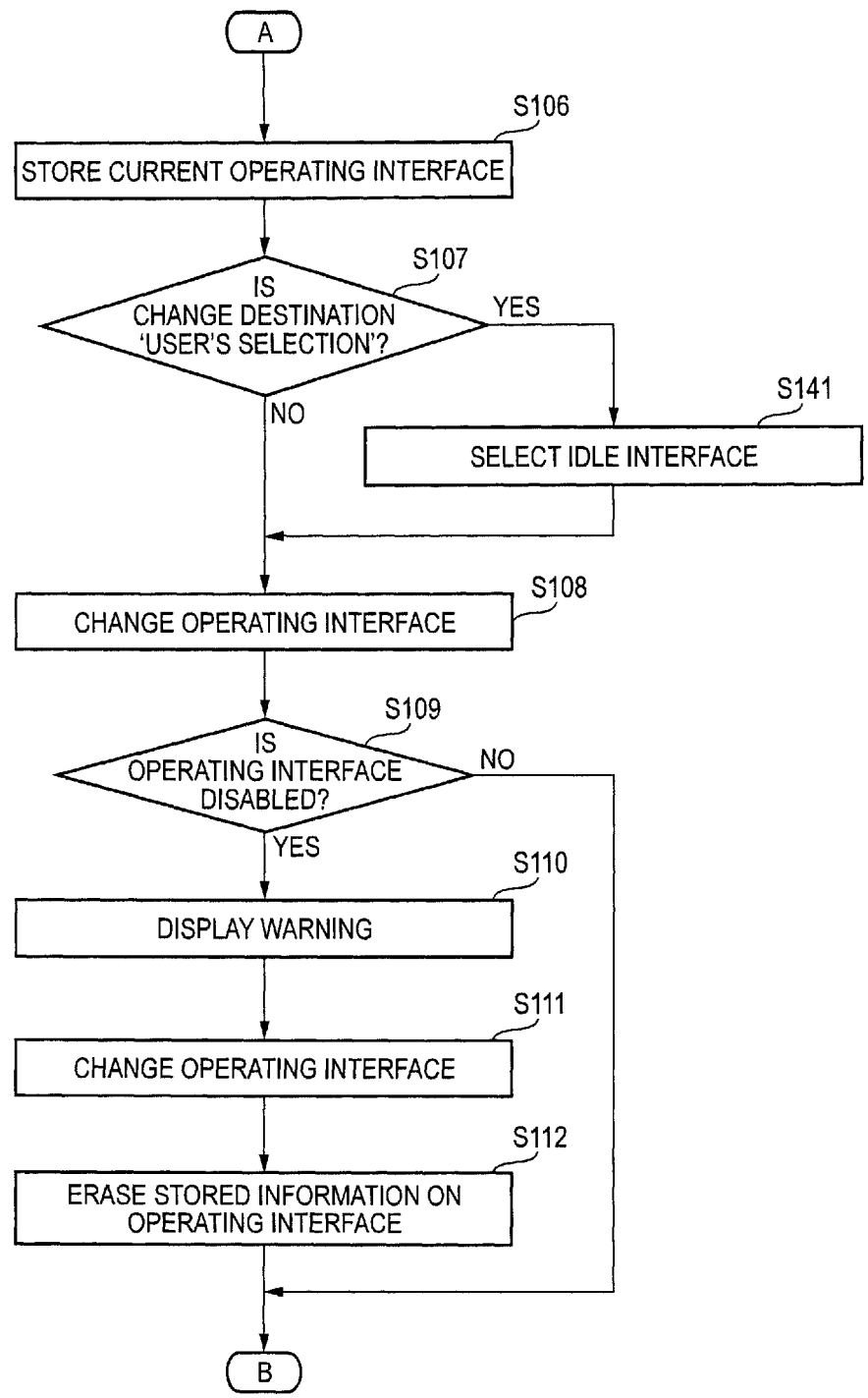
FIG. 6 is a second flow chart illustrating the procedure of the power saving process according to the exemplary embodiment.

In a case where the input corresponds to the predetermined process (YES in STEP S104) and the prohibition flag is in the OFF state (NO in STEP S105), the power saving process proceeds to STEP S106 of FIG. 6, where information on the interface for return which is the current operating interface is stored in the memory 530 of the power supply controller 53.

Figure 7:
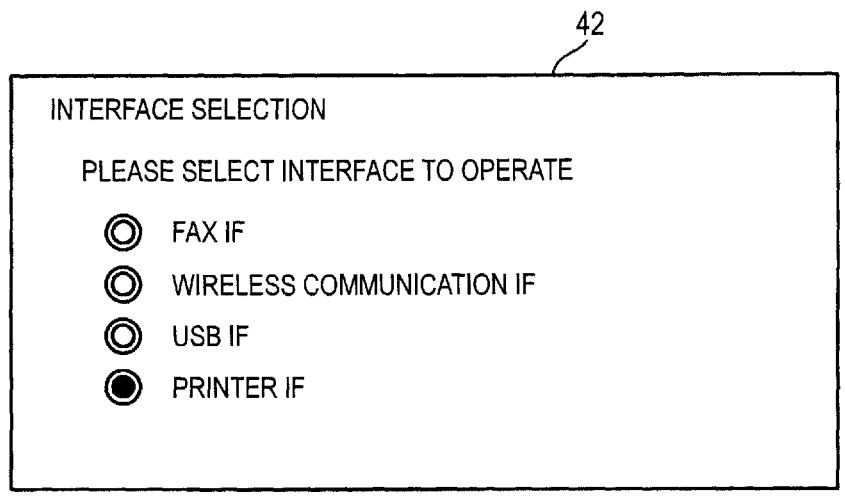
FIG. 7 is a view illustrating a screen for selecting an interface to operate.

Next, in STEP S107, it is determined whether the change destination associated to the corresponding predetermined process is 'USER'S SELECTION'. In a case where the change destination is 'USER'S SELECTION' (YES in STEP S107), as shown in FIG. 7, in STEP S141, the idle interfaces are listed on the display unit 42 of the operation panel 40, and the user is inquired about an idle interface to be a power supply target (one example of a selecting process).

For example, if information as shown in FIG. 4 has been registered in the database 531, in a case where the network interface 61 is an operating interface, the change destination is 'USER'S SELECTION'. Therefore, when the network interface 61 is an operating interface, if a specific packet is received as the predetermined process, STEP S141 is performed. A selection screen which is displayed in that case is shown in FIG. 7. Since the network interface 61 is the origin of change, the network interface 61 is not displayed as an option on the selection screen. As an inquiring means, a selection screen may be displayed on the operation panel 40 or an external apparatus. Incidentally, in a case where the operation panel 40 is not an operating interface at the stage of STEP S141, power supply to the operation panel 40 restarts temporarily, and after the user selects an idle interface by operating the operation panel 40, the power supply to the operation panel 40 is cut off.

After the selection result is input in STEP S141, or when the change destination is not 'USER'S SELECTION' (NO in STEP S107), in STEP S108, the operating interface is changed (one example of a changing process). That is, the power supply to the current operating interface is cut off such that the current operating interface becomes an idle interface, and power supply to the interface for return selected in STEP S141 or the interface for return set as the change destination corresponding to the predetermined process restarts such that the corresponding interface becomes an operating interface. Incidentally, any one of the cutoff of the power supply to the operating interface and the restart of power supply to the interface for return may be first performed, or both of them may be performed at the same time. The power supply periods for both interfaces may overlap each other.

Figure 8:
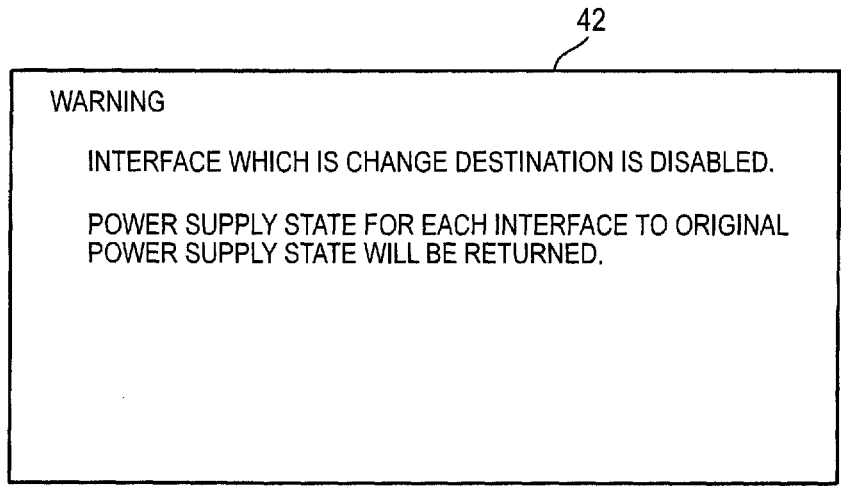
FIG. 8 is a view illustrating a warning screen.

Next, in STEP S109, it is determined whether the operating interface which is the change destination is disabled (one example of a checking process). Here, examples of the disabled state include not only a state in which the operating interface is broken or communication with the operation interface is disconnected but also a state in which communication with the operating interface is unstable due to, for example, a poor radio transmission in wireless communication. In a case where it is determined that the operating interface is disabled (YES in STEP S109), in STEP S110, a warning message as shown in FIG. 8 is displayed on the display unit 42 of the operation panel 40 (one example of a warning process). The warning message notifies that at least the interface which is the change destination is disabled. Incidentally, as a notifying means, the warning message may be displayed an external apparatus.

After STEP S110, in STEP S111, the operating interface is changed (one example of a third changing process). That is, the power supply to the interface for return having changed into the operating interface in STEP S108 is cut off such that the corresponding interface for return returns to an idle interface, and power supply to the interface for return having changed into the idle interface in STEP S108 restarts such that the corresponding interface for return returns to an operating interface. In a case where the operating interface which is the change destination is disabled, if the operating interface is changed, it may become impossible to receive any transition command. For this reason, in that case, the operating interface returns to its origin state.

After STEP S111, in STEP S112, information on the operating interface stored in STEP S106 is erased from the memory 530. After STEP S112, or if it is not determined that the operating interface is disabled (NO in STEP S109), the power saving process proceeds to STEP S103 of FIG. 5, and it is determined whether there has been any input for the operating interface.

Returning to the description of the flow chart of FIG. 5, in a case where there has not been any input for the operating interface (NO in STEP S103), in STEP S161, it is determined whether there is information on any interface for return stored in the memory 530 of the power supply controller 53. In a case where information on any interface for return has not been stored (NO in STEP S161), it can be determined that STEP S108 for changing the operating interface has not been performed. For this reason, the power saving process returns to STEP S103, and it is determined whether there has been any input for the operating interface.

In a case where information on an interface for return has been stored (YES in STEP S161), it can be determined that STEP S108 for changing the operating interface has been performed. Then, in STEP S162, it is determined whether a duration (hereinafter, referred to as an idle time period after change) when any input has not been input to the changed operating interface from when the operating interface was changed is equal to or longer than a threshold time period. The threshold time period depends on the operating interface which is the change destination, and has been registered as a timeout period of the database 531. The idle time period after change is measured by the power supply controller 53.

In a case where the idle time period after change is equal to or longer than the threshold time period (YES in STEP S162), similarly to STEP S111, in STEP S163, the operating interface is changed (one example of a second changing process). That is, if the changed operating interface has not been used for a long time, there is a high possibility that the user may forget that the operating interface has been changed or it has become unnecessary to use the changed operating interface. On the other hand, it is difficult for a third party to grasp that the operating interface has been changed. For this reason, in that case where the idle time period after change is equal to or longer than the threshold time period, the power supply state returns to the state before the change of the operating interface was made.

After STEP S163, in STEP S164, the stored information on the interface for return is erased from the memory 530. After STEP S164, or if it is determined that the idle time period after change is shorter than the threshold time period (NO in STEP S162), the power saving process proceeds to STEP S103, and it is determined whether there has been any input for the operating interface.

On the other hand, in a case where there has been an input for the operating interface (YES in STEP S103) but the input does not correspond to the predetermined process (NO in STEP S104), or the prohibition flag is in the ON state (YES in STEP S105), it is considered that a transition command has been input. Thus, in STEP S121, supply of power to the image forming unit 1, the image reading unit 2, the control unit 30, and all interfaces for return restarts. Therefore, transition to the ready mode is performed. In a case where information on the operating interface has been stored, when transition to the ready mode is performed, that information is erased from the memory 530. After STEP S121, the power saving process finishes.

According to the above-described power saving process, in the power saving mode, the power supply destination of the interface for return is changed. For example, if information as shown in FIG. 4 is registered in the database 531 and the interface for return to be an operating interface immediately after transition to the power saving mode is the operation panel 40, immediately after the transition to the power saving mode, the power supply to all of interfaces for return other than the operation panel 40 is cut off.

In this state, if the dedicated button for fax reception provided to the operation panel 40 is pushed, for example, the operating interface is changed from the operation panel 40 to the fax interface 62. Further, if the dedicated button for network reception provided to the operation panel 40 is pushed, for example, the operating interface is changed from the operation panel 40 to the network interface 61. Still further, if the dedicated button for USB reception provided to the operation panel 40 is pushed, for example, the operating interface is changed from the operation panel 40 to the USB interface 64. Like this, in the power saving process of the present exemplary embodiment, in a case where a specific process for an operating interface is received, the operating interface is changed in the power saving mode, without transition to the ready mode.

Incidentally, in a case where it is desired to use another interface for return, operation other than operation stored as the predetermined process for the operation panel 40 is performed. According thereto, transition to the ready mode is performed such that power supply to all interfaces for return restarts. As a result, it is possible to use the desired interface for return.

As described above, the MFP 100 of each exemplary embodiment has the plurality of interfaces capable of receiving a transition command. Further, in the power saving mode, the MFP 100 changes the power supply status for the interfaces for return. Specifically, when a predetermined process is input to the operating interface in the power saving mode, the idle interface designated as the change destination changes into an operating interface, without transition to the ready mode in which power is supplied to the image forming unit 1 and the image reading unit 2. Therefore, in a case where a signal input to the operating interface is the predetermined process, wasted power is not consumed for changing the operating interface.

The above-described exemplary embodiments are merely examples, and do not limit the present invention. Therefore, the present invention can be improved and modified in various forms without departing from the scope. For example, the present invention is not limited to the MFP, but is applicable to any apparatuses having an image forming function or an image reading function, such as a printer, a copy machine, a scanner, and a FAX.

In the above-described exemplary embodiments, the power supply controller 53 manages the supply of power to all interfaces for return. However, the present invention is not limited thereto. For example, a dedicated board for managing power supply may be provided for each interface for return. In this case, if there is an operating interface, power is supplied even to a dedicated board corresponding to that operating interface, such that an input of a transition command is monitored. On the other hand, if there is an idle interface, supply of power to a dedicated board corresponding to that idle interface is cut off. In the power saving mode, the supply of power to units other than the operating interface and its dedicated board is cut off. At this time, the supply of power to the control unit 30 is also cut off. If an operating interface receives a transition command, the supply of power to all units including the control unit 30 restarts.

In the above-described exemplary embodiments, after the operating interface is changed, if the operating interface which is the change destination is not used for the threshold time period or more, the operating interface which is the change destination returns to an idle interface. However, this return is not necessarily required. Further, in the above-described exemplary embodiments, after the operating interface is changed, if the operating interface which is the change destination is disabled, the operating interface returns to an idle interface. However, this return is not necessarily required.

Further, in the above-described exemplary embodiments, after the operating interface is changed, the power supply to the operating interface which is the change destination is maintained. Alternatively, after the operating interface which is the change destination is used, the power supply state may return to the original power supply state. That is, the operating interface which is change destination may return to the idle interface, and power supply to the idle interface which is the change origin may restart.

Still further, in the above-described exemplary embodiments, the timeout period for the idle time period after change is acquired from the database 531. Alternatively, a common timeout period may be set, and this timeout period may be used as the threshold time period, regardless of the kind of the operating interface.

In the MFP 100 of the exemplary embodiment, it is possible to make an interface for return, which is to be an operating interface immediately after transition to the power saving process, function as an interface for activating an idle interface. In this case, after the predetermined process is input, power supply to the operating interface immediately after the transition to the power saving mode is cut off, such that the operating interface becomes an idle interface. Therefore, wasted power is not consumed.

What is claimed is:

1. An image forming apparatus comprising:
an image forming unit configured to form an image;
a power supply controller configured to control the image forming apparatus to operate in a power saving mode, in which supply of power to the image forming unit is cut off, and a normal mode, in which supply of power to the image forming unit is performed, wherein the power supply controller is configured to be switched between the power saving mode and the normal mode; and
a plurality of interfaces configured to receive a transition command for transition from the power saving mode to the normal mode,
wherein the power supply controller is configured to perform:
an interface-power supply process of supplying power to at least one of the plurality of interfaces; and
a changing process of, in a case where a predetermined signal is input to an operating interface receiving power in the interface-power supply process in the power saving mode, cutting off power supply to the operating interface and starting power supply to at least one of idle interfaces other than the operating interface.

2. The image forming apparatus according to claim 1,
wherein the predetermined signal has a plurality of kinds, and
wherein the power supply controller in the changing process determines an idle interface to be a power supply target on the basis of the kind of the predetermined signal.

3. The image forming apparatus according to claim 1,
wherein the power supply controller in the changing process determines an idle interface to be a power supply target on the basis of a kind of the operating interface having received the predetermined signal.

4. The image forming apparatus according to claim 1,
wherein the power supply controller is further configured to perform a selecting process of allowing a user to select an idle interface to be a power supply target when the predetermined signal is input to the operating interface, and
wherein the power supply controller in the changing process starts power supply to the idle interface selected in the selecting process.

5. The image forming apparatus according to claim 1,
wherein the power supply controller is further configured to perform a second changing process of, in a case where an idle time period of the operating interface to which power supply has started in the changing process is equal to or longer than a threshold time period, cutting off power supply to the operating interface and restarting power supply to the idle interface for which the power supply has been cut off in the changing process.

6. The image forming apparatus according to claim 1, wherein the power supply controller is further configured to perform:
   a checking process of checking whether the operating interface, to which power supply has started in the changing process, is enabled; and
   a third changing process of, in a case where the operating interface checked in the checking process is disabled, cutting off power supply to the disabled operating interface and restarting power supply to the idle interface for which the power supply has been cut off in the changing process.

7. The image forming apparatus according to claim 6, wherein the power supply controller is further configured to perform a warning process of, in a case where the operating interface checked in the checking process is disabled, warning a user about that the operating interface, to which power supply has started in the changing process, is disabled.

8. An image reading apparatus comprising:
   an image reading unit configured to read an image;
   a power supply controller configured to control the image reading apparatus to operate in a power saving mode, in which supply of power to the image reading unit is cut off, and a normal mode, in which supply of power to the image reading unit is performed, wherein the power supply controller is configured to be switched between the power saving mode and the normal mode; and
   a plurality of interfaces configured to receive a transition command for transition from the power saving mode to the normal mode,
   wherein the power supply controller is configured to perform:
      an interface-power supply process of supplying power to at least one of the plurality of interfaces; and
      a changing process of, in a case where a predetermined signal is input to an operating interface receiving power in the interface-power supply process in the power saving mode, cutting off power supply to the operating interface and starting power supply to at least one of idle interfaces other than the operating interface.

9. A multi-function peripheral comprising:
   an image forming unit configured to form an image;
   an image reading unit configured to read an image;
   a power supply controller configured to control the multi-function peripheral to operate in a power saving mode, in which supply of power to the image forming unit and the image reading unit is cut off, and a normal mode, in which supply of power to the image forming unit and the image reading unit is performed; and
   a plurality of interfaces configured to receive a transition command for transition from the power saving mode to the normal mode,
   wherein the power supply controller is configured to perform:
      an interface-power supply process of supplying power to at least one of the plurality of interfaces; and
      a change process of, in a case where a predetermined signal is input to an operating interface receiving power in the power saving mode, cutting off power supply to the operating interface and starting power supply to at least one of idle interfaces other than the operating interface.

* * * * *